(12) United States Patent
Bocharov et al.

(10) Patent No.: US 9,071,745 B2
(45) Date of Patent: Jun. 30, 2015

(54) AUTOMATIC CAPTURING OF DOCUMENTS HAVING PRELIMINARILY SPECIFIED GEOMETRIC PROPORTIONS

(71) Applicant: ABBYY Development LLC, Moscow (RU)

(72) Inventors: Konstantin Bocharov, Moscow (RU); Vasily Loginov, Moscow (RU); Lokov Lyubimov, Moscow (RU); Ivan Zagaynov, Zhukovsky (RU)

(73) Assignee: ABBYY Development LLC (RU)

( * ) Notice: Subject to any disclaimer, the term of this patent is extended or adjusted under 35 U.S.C. 154(b) by 3 days.

(21) Appl. No.: 14/162,694

(22) Filed: Jan. 23, 2014

(65) Prior Publication Data

US 2014/0376060 A1    Dec. 25, 2014

(51) Int. Cl.
*H04N 1/024* (2006.01)
*H04N 1/04* (2006.01)
*G06K 9/34* (2006.01)
*G06K 9/36* (2006.01)
*H04N 1/23* (2006.01)

(52) U.S. Cl.
CPC ...................................... *H04N 1/23* (2013.01)

(58) Field of Classification Search
CPC . H04N 1/2112; H04N 2201/00; H04N 5/772; H04N 1/2158; H04N 1/2137; H04N 1/00681; H04N 1/193; H04N 1/00748; H04N 1/00737; H04N 1/1017; G06K 9/036; G06K 9/00456; G06T 7/60; G06T 7/004; G06T 7/0057
USPC .............. 358/472, 473, 906, 909.1, 488, 464, 358/453, 521, 474; 382/286, 291, 282, 171, 382/312, 313
See application file for complete search history.

(56) References Cited

U.S. PATENT DOCUMENTS

| | | | | |
|---|---|---|---|---|
| 6,111,667 | A * | 8/2000 | Mishima et al. | 358/488 |
| 2011/0035662 | A1* | 2/2011 | King et al. | 715/273 |
| 2013/0155474 | A1* | 6/2013 | Roach et al. | 358/505 |
| 2014/0032406 | A1* | 1/2014 | Roach et al. | 705/42 |
| 2014/0369556 | A1* | 12/2014 | Zagaynov et al. | 382/103 |

* cited by examiner

*Primary Examiner* — Cheukfan Lee
(74) *Attorney, Agent, or Firm* — LeighAnn Weiland; Veronica Weinstein

(57) ABSTRACT

Methods, devices, and systems for capturing documents are provided. A frame in a viewfinder is selected and is converted into a binary version. Segmentation of the binarized version of the frame is performed using computed horizontal and vertical histograms. At least one document is identified in the selected frame. The at least one document is captured upon determining that values of the one or more parameters associated with the document match predetermined values of corresponding one or more parameters.

32 Claims, 8 Drawing Sheets

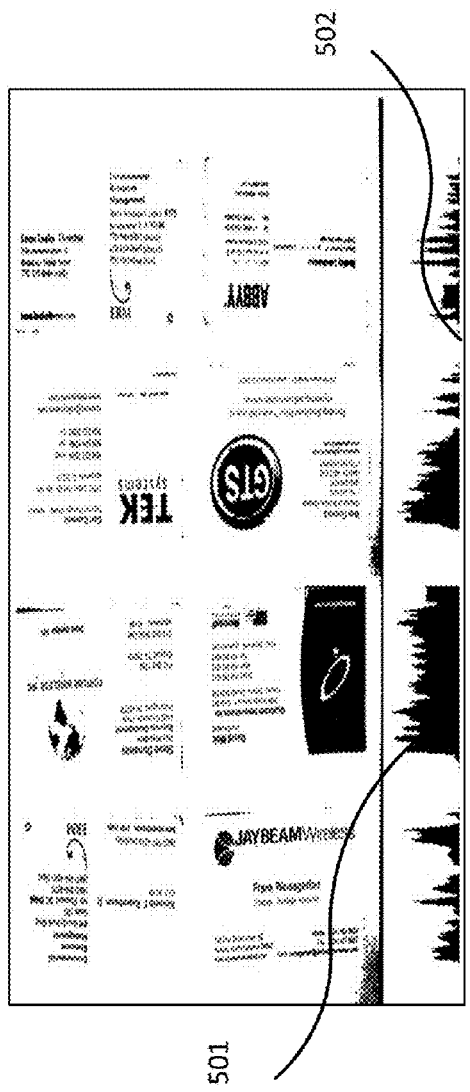
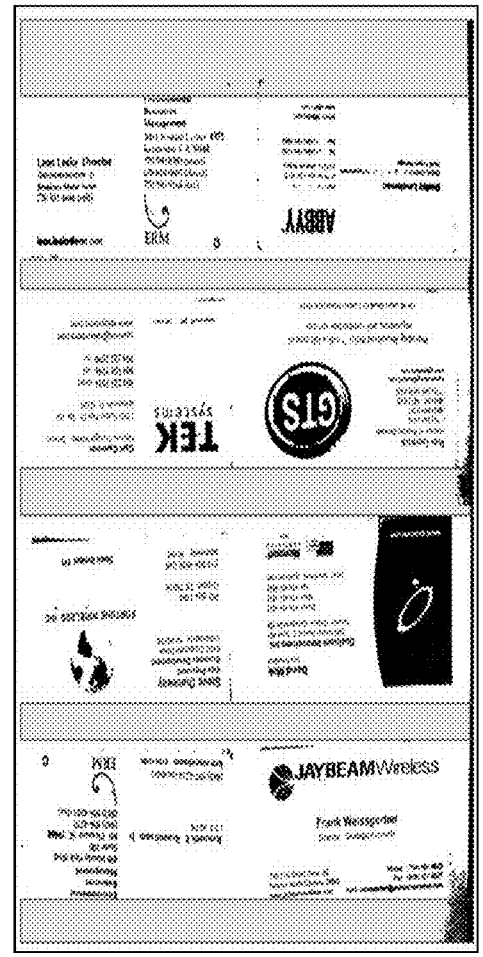
FIG. 5A
FIG. 5B

AUTOMATIC CAPTURING OF DOCUMENTS HAVING PRELIMINARILY SPECIFIED GEOMETRIC PROPORTIONS

CROSS-REFERENCE TO RELATED APPLICATIONS

This application claims priority under 35 USC 119 to Russian patent application No. 2013127798, filed Jun. 19, 2013, the disclosure of which is incorporated herein by reference.

BACKGROUND

The present disclosure generally relates to a device, system, method, and a computer program in the field of document image processing. Mobile devices (e.g., smartphones, mobile phones, laptops, tablet computers, notebooks, personal digital assistants, etc.) are becoming increasingly available worldwide. Moreover, mobile devices are becoming more portable and more powerful. They are always at hand and their capabilities are comparable with PC capabilities. As a result, the mobile electronic devices have become indispensable assistants in business, education, communication, in travel or in everyday life. Especially since most mobile electronic devices have embedded photo and/or video cameras, they are often used for capturing images. In the mobile market, there are many software applications that process namely already captured images, but most of them have several deficiencies. Cameras in the mobile devices have an electronic viewfinder (EVF), where the image captured by the lens is projected electronically onto a display screen in such a manner that the user sees a preview of a future image or video frame. The preview on the display is used to facilitate in directing the camera at the scene to be photographed. In our application the scene of interest is one or more documents.

The process of capturing an image with mobile devices often requires a user's participation, for example, by requiring a user to manually adjust settings to accommodate prevailing light conditions, stabilize the mobile device to avoid blur or defocusing of text to be captured or object to be captured. It is also important to place an object (for example a document) exactly within the limits of a viewfinder. A user photographing a document in a hurry can result in distorted bounds of the photographed document (e.g., the bounds can be excessively cropped). However, often the user does not have a chance to quickly select the right settings on the device in order to capture an ideal photograph of a document. As a result, the user may need to capture several photographs or images of a document in order to be able to select the best shot with the least number of defects or distortions. This is time consuming and requires a lot of user effort, especially when the user needs to capture a large number of text documents in a limited amount of time. When there are many documents of different sizes to be captured, time is needed for sorting them before capturing the desired documents. Different types of documents exist, for example, business cards, financial checks, bills, and printed forms. Placing each document from a collection of documents in front of a camera of a device and capturing an acceptable text image from each one can be a troublesome task.

SUMMARY

An exemplary embodiment relates to a method for capturing documents. The method includes selecting a frame in a viewfinder. The method further includes converting the frame into a binary version of the frame. The method further includes computing a horizontal histogram of distribution of pixels along horizontal direction of the binarized version of the frame. The method further includes computing a vertical histogram of distribution of pixels along vertical direction of the binarized version of the frame. The method further includes performing segmentation of the binarized version of the frame using the horizontal histogram and the vertical histogram resulting in one or more horizontal and vertical segments, wherein each of the one or more horizontal and vertical segments corresponds to one document included in the frame. The method further includes identifying at least one document in the selected frame, wherein one or more parameters are associated with the at least one document. The method further includes comparing values of one or more parameters associated with the at least one identified document with predetermined values for the one or more parameters. The method further includes capturing the at least one document upon determining that values of the one or more parameters associated with the document match predetermined values corresponding to the one or more parameters.

Another exemplary embodiments relates to a system comprising one or more data processors; and one or more storage devices storing instructions that, when executed by the one or more data processors, cause the one or more data processors to perform operations. The operations comprising converting the frame into a binary version of the frame. The operations further comprising computing a horizontal histogram of distribution of pixels along horizontal direction of the binarized version of the frame. The operations further comprising computing a vertical histogram of distribution of pixels along vertical direction of the binarized version of the frame. The operations further comprising performing segmentation of the binarized version of the frame using the horizontal histogram and the vertical histogram resulting in one or more horizontal and vertical segments, wherein each of the one or more horizontal and vertical segments corresponding to one document included in the frame. The operations further comprising identifying at least one document in the selected frame, wherein one or more parameters are associated with the at least one document. The operations further comprising comparing values of one or more parameters associated with the at least one identified document with predetermined values for the one or more parameters. The operations further comprising capturing the at least one document upon determining that values of the one or more parameters associated with the document match predetermined values corresponding to the one or parameters.

Yet another exemplary embodiment relates to computer readable storage medium having machine instructions stored therein, the instructions being executable by a processor to cause the processor to perform operations. The operations comprising converting the frame into a binary version of the frame. The operations further comprising computing a horizontal histogram of distribution of pixels along horizontal direction of the binarized version of the frame. The operations further comprising computing a vertical histogram of distribution of pixels along vertical direction of the binarized version of the frame. The operations further comprising performing segmentation of the binarized version of the frame using the horizontal histogram and the vertical histogram resulting in one or more horizontal and vertical segments, wherein each of the one or more horizontal and vertical segments corresponding to one document included in the frame. The operations further comprising identifying at least one document in the selected frame, wherein one or more parameters are associated with the at least one document. The operations further comprising comparing values of one or more parameters associated with the at least one identified document with predetermined values for the one or more parameters. The operations further comprising capturing the at least one document upon determining that values of the one or more parameters associated with the document match predetermined values corresponding to the one or parameters.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

FIG. 5A is an illustration of an example of computation of a horizontal histogram, in an accordance with an example implementation;

FIG. 5B is an illustration of separating a current picture (view) into several parts, in an accordance with an example implementation;

DETAILED DESCRIPTION

Figures 1A, 1B:
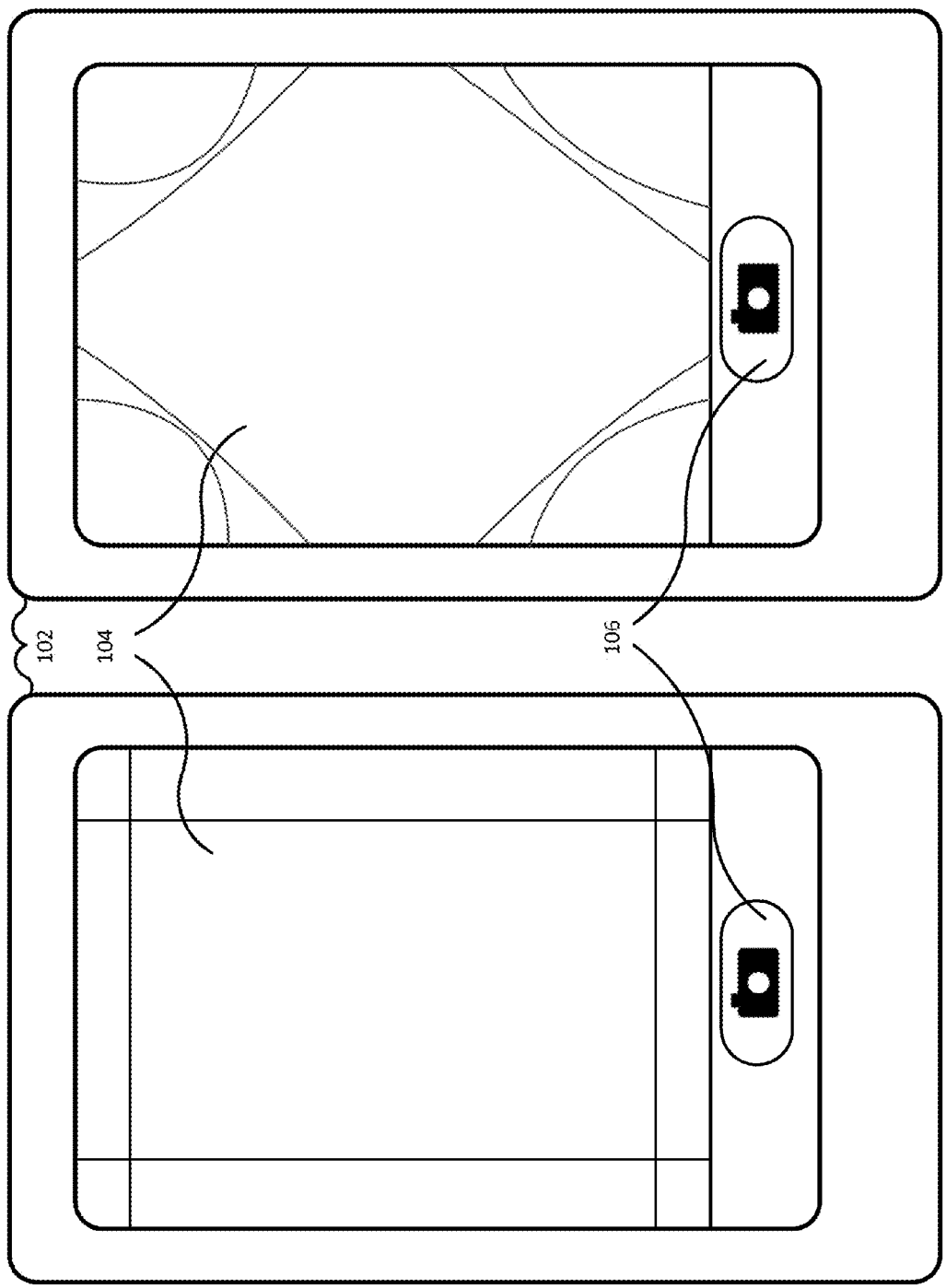
FIGS. 1A-B are illustrations of an electronic device screen, in an accordance with an example implementation.

In the following description, for purposes of explanation, numerous specific details are set forth in order to provide a thorough understanding of the invention. It will be apparent, however, to one skilled in the art that the invention can be practiced without these specific details. In other instances, structures and devices are shown only in block diagram form in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Advantageously the present invention is implemented for performing an automatic capturing a document. The term "automatic capturing" means that this invention provides an opportunity to perform a preliminary analysis of current picture (view) on a display of an electronic viewfinder of a mobile device, wherein a current picture (view) is received by lens in real-time without recording a video or capturing an image. Analysis is performed by tracking current pictures (views) that contain document(s) with specified proportions or dimensions. If one or more documents having desired proportions or dimensions are detected in a current picture (view), an automatic capturing of an image is performed.

There is a plethora of portable electronic devices with display screens capable of displaying text. These portable devices typically include a camera which allows these devices to capture images. Devices with a display screen and/or touch screen and a camera include many mobile devices, such as laptops, tablet computers, smartphones, mobile phones, personal digital assistants (PDAs), etc. The disclosed invention facilitates electronic devices to capture or automatically shoot a document having specified parameters. Subsequent to detecting and/or capturing an image of the document, there may be additional or subsequent processing of one or more images captured, by for example, optical character recognition (OCR). OCR functionality may be installed locally in the electronic device or may be operated and made available via or in cooperation with one or more accessible servers. OCR functionality may be accessible via a network, or some standard or protocol such as the through the Internet, WiFi, Zigbee®, or Bluetooth® technology. OCR systems transform images or representations of paper documents into computer-readable and computer-editable and searchable electronic files. A typical OCR system includes an imaging device or component that produces images of documents and software that processes the images. Generally, this software includes an OCR program or set of algorithms that can recognize symbols, letters, characters, digits, and other units and save them into a computer-editable format—an encoded format.

FIGS. 1A-B illustrate an exemplary electronic device 102 having a display screen 104 and camera button 106 for triggering shooting of an image with a camera (not shown) embedded in the electronic device 102. The button 106 may be a virtual button displayed on the screen of the electronic device, depending on the user interface of the electronic device 102. The button 106 may be a physical button connected to the system blocks of the electronic device 102). The content (not shown) presented on the display screen 104 may be captured using a camera viewfinder that sends an image of a subject of interest to the display screen 104. The documents in the frame may be automatically captured based on results of a preliminary analysis of the current view in the viewfinder, where the current view represents image data prior to the image data being saved memory (e.g., in long term memory).

The electronic device 102 may comprise a general purpose computer embodied in different configurations such as a mobile phone, smartphone, cell phone, digital camera, laptop computer or any other gadget having a screen and a camera, or access to an image or image-generating device or component. A camera allows conversion of information (e.g., represented on paper) into digital form.

Figure 2:
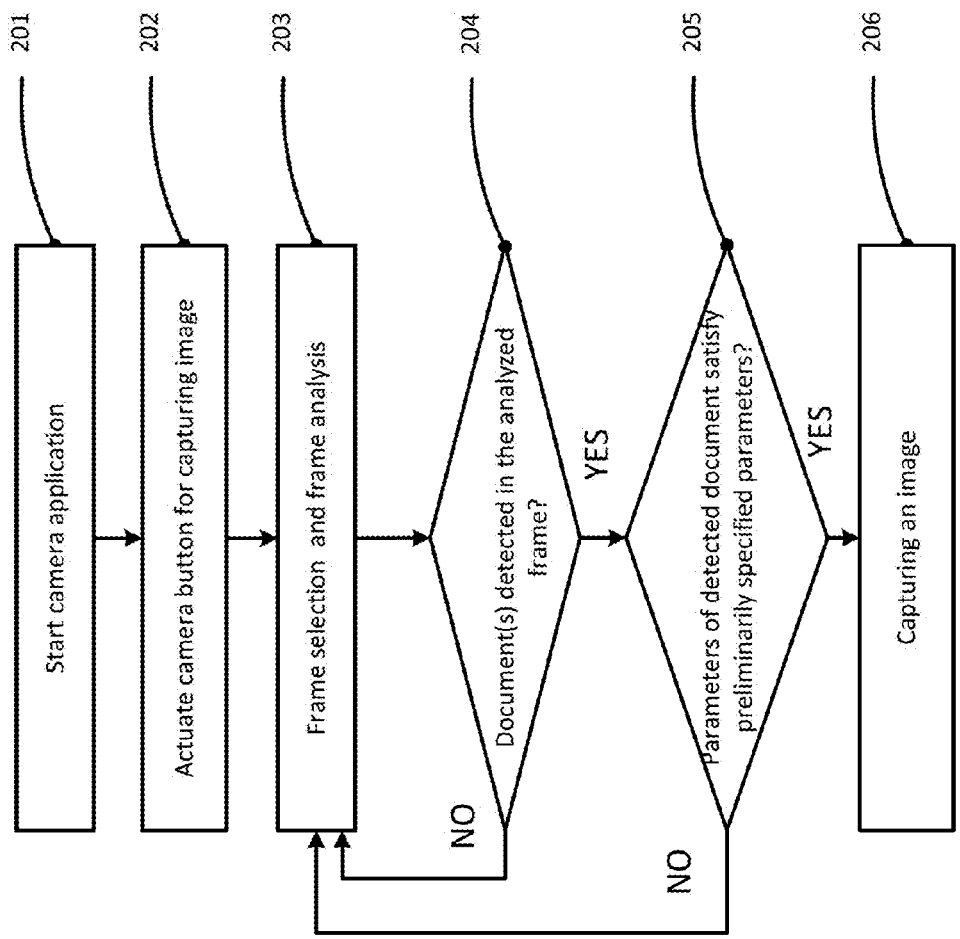
FIG. 2 is a flow diagram of a process for preliminary image processing, in an accordance with an example implementation.

Referring to FIG. 2, a flow diagram of a process 200 is provided. The process 200 can be implemented on a computing device (e.g., a user device). In one embodiment, the process 200 is encoded on a computer-readable medium that contains instructions that, when executed by the computing device, cause the computing device to perform operations of the process 200.

At block 201, a camera or a camera application (or any application that has access to and is configured to control the camera associated with the electronic device 102) is launched. At block 202, the user presses or activates a button that launches capturing of an electronic image or recording of a video. In one embodiment, after activation of the button 106, image capturing or video recording is not yet performed at this point. From this moment, analysis of the shot or frame begins. The button 106 triggers capturing of an image after current picture (view) in a viewfinder is analyzed and one or more documents, with one or more desired parameters, proportions, dimensions or characteristics are detected. The process includes use of an exemplary button 106 as shown in FIG. 1A, whereby the user activates the button 106 or a designated area of the touch screen 104 to initiate the process.

In one embodiment, one or more current pictures (views), shown in the viewfinder embedded into the electronic device, are selected (block 203) in real-time using predetermined frequency. The term "real-time" is used herein to refer at least to a method of performing the analysis of a current picture (view) in the viewfinder, which can be displayed on the screen of the mobile electronic device. The display of the current picture (view), received using the viewfinder, takes place in real-time without recording a video or capturing an image in the traditional sense, such as persisting an image to an electronic storage.

In one embodiment, the system tracks current pictures (views). The current picture (view) may include one or more documents having desired predetermined proportions (and/or dimensions, shapes, etc.). Once such views are detected in the viewfinder, automatic capturing of the document or video recording is performed for subsequent processing. The parameters (e.g., proportions or dimensions) of a document that needs to be automatically captured by the camera may be predetermined in the application or may be predefined by a user using in one or more settings of the application or component that analyzes and searches for documents with the specified proportions or dimensions.

Selection and analysis of a current picture (view) are performed without interrupting display of a video signal on the screen of the electronic device. As used herein, the term "selected current picture (view)" (shown on the display 104 in FIG. 1A) is intended to refer to a picture (view) currently analyzed. The terms "frame" and "current picture view" are used interchangeably herein. For example, a current picture (view) in a viewfinder may be selected with a frequency of approximately ten frames/views per second. Any other frequencies may be used including 2, 4, 6, frames/views per second.

In another embodiment, selection and analysis of a frame in the viewfinder may be performed in non-real-time. That means that video with documents may be recorded earlier having depiction of a document or multiple documents, and this video recording may be extracted from a memory storage (604) of the electronic device, or from other external sources (e.g., the Internet, memory cards), or may be downloaded from other electronic devices (e.g., using technology Bluetooth).

Once a current picture (view) is selected from a video stream, transmitted to the screen from the electronic device using the viewfinder, the analysis of the selected current picture (view) starts (block 203). The analysis of the frame performed in real-time without interrupting the video stream, so that the human eye can't detect a time delay or other distortions of the video stream. The goal of the frame analysis is detection of base lines (or in other words, base edges or boundaries of a document) that will subsequently form a candidate of the document. As used herein, the terms "base lines" refer to the edges of the document, which need to be reliably detected using the viewfinder of the electronic device. For example, if a document to be detected is a quadrangle, the number of base lines of this document equals four.

Figure 3:
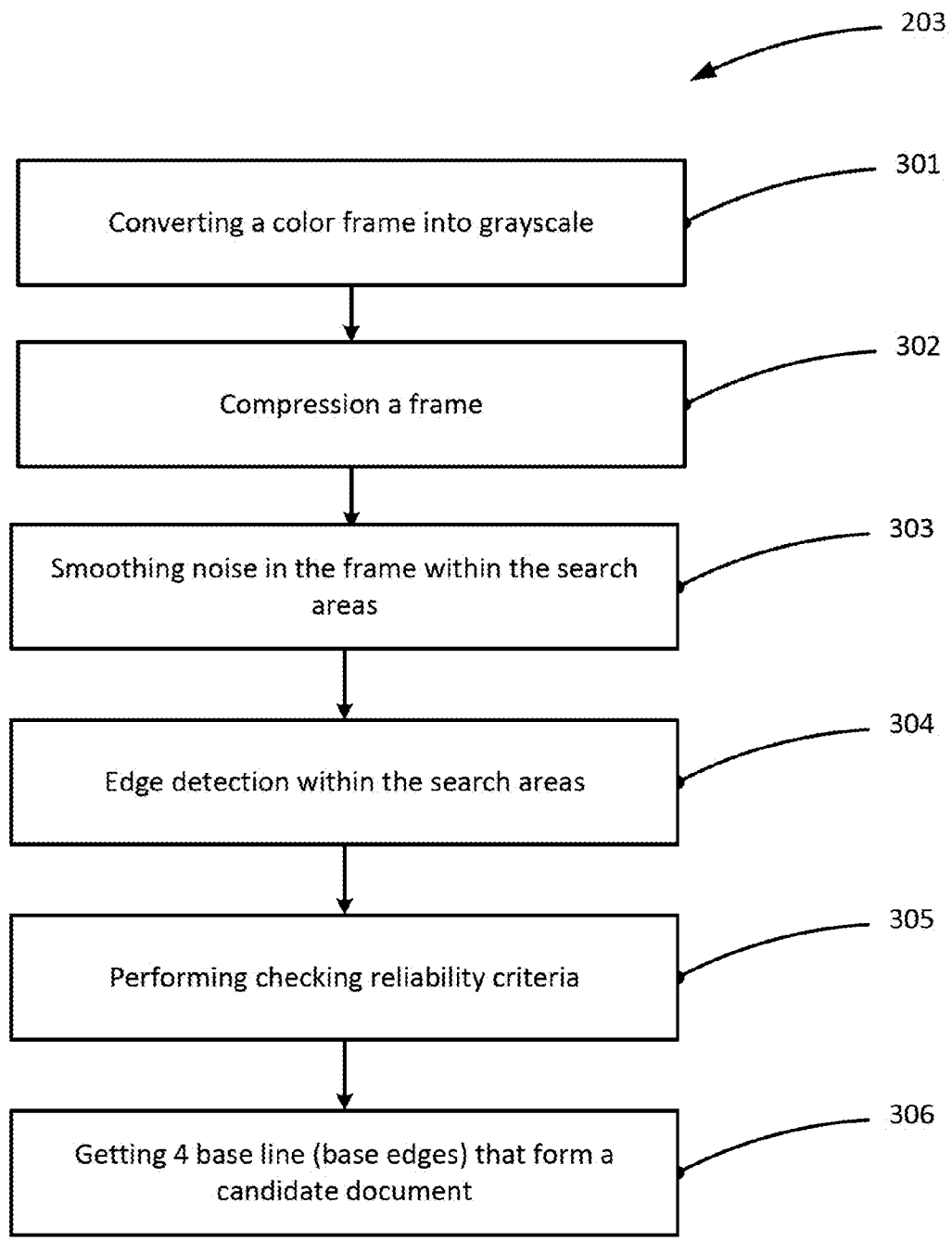
FIG. 3 is a flow diagram of a process for detecting a single document within a viewfinder of a camera application, in an accordance with an example implementation.

FIG. 3 is a flow diagram in accordance with one embodiment. In this embodiment, a single document is expected to be detected in the viewfinder, the document having the requisite parameters. A colored current picture (view) in the viewfinder may be presented using a RGB (Red-Green-Blue) color model. At block 301, the colored current picture (view) is converted to a grayscale view. Pixels of the grayscale view are characterized by values representing brightness, ranging from 0 (black color) to 255 (white color).

For conversion of an initial color frame into a frame in a grayscale, it is necessary to compute "luma" of the frame—component Y (or just brightness). In order to do that, it is convenient to represent the RGB frame in the color YUV model (or HSL, HSV, etc.). The following formula may be utilized for computing the "luma" component (the brightness component Y):

$$Y=0.299*R+0.587*G+0.114*B,$$

where R, G and B denote intensity of red, green and blue colors, respectively. If the camera (including the viewfinder) has a setting for displaying the frame on the display screen in a grayscale regime, then the described above step (301) of converting a color picture (view) into a grayscale may be omitted.

At block 302, the grayscale frame is compressed by using one of various compression techniques. For example, decrease in frame size may be achieved using a bilinear interpolation. The frame needs to be compressed to such a degree that that small detail (e.g., noise, dots, scratches, etc.) are removed from the frame, while significant objects in the frame will be distinctly shown. For example, the frame may be reduced down to 50-100 megapixels. Using compression techniques on the frame significantly reduces the running time of the subsequent analysis of the frame in real-time.

Next, a document within the analyzed frame may be detected. Thus, during the analysis of the selected frame, edge analysis is performed. An edge detection algorithm allows for locating the boundaries or borders within the frame. However, an analysis of the entire frame using one or more edge detection algorithms is not desirable while operating in real-time, because such analysis would consume a lot of resources of the electronic device and would be time consuming. Thus, the edge detection analysis may be performed only in certain areas of the frame (or in other words, search areas or regions of interest—"ROI"). Corresponding search areas in the viewfinder should be formed in accordance with the proposition that edges (boundaries) of documents in the viewfinder will fall into those areas. In a preferred embodiment, the analysis of the selected frame is performed only within one or more search areas. In other embodiments, the analysis of the entire frame may be performed.

In one embodiment, the search (or ROI) areas may be represented as rectangular areas. FIG. 1A illustrates the ROIs formed as rectangular strips along the borders of the display screen (of the viewfinder). The parameters (e.g., width and length) of the rectangular strips may be predefined by a user or may be set by default in the application settings.

In another embodiment, one or more ROI's may be represented as quarter circles with centers located in the corners of the viewfinder with predefined radiuses. The radius of these circles (radiuses of ROI) may be pre-determined (e.g., set by default). FIG. 1B illustrates these types of ROIs. The larger the radiuses of these ROI's, the larger the area of the screen (viewfinder) that they cover. Other types and forms of ROI are possible. The ones described herein are merely exemplary. However, analysis of excessively large areas in the frame requires more time and more computational resources of the electronic device. Thus, the radius of the ROI (such as quarter-circle search area) should be optimally configured or adapted to conform to the device on which the processing occurs.

Next, only the portion of the frame that is inside the search area of the viewfinder is processed. A "current picture (view)" or frame is also intended to refer to parts of the current picture (view) or frame that are analyzed within the ROI. Almost all frames received by the viewfinder of the electronic device contain noise that may interfere with receiving accurate results during the process of performing subsequent analysis of the frame. The term "noise" may refer to some interference caused by placement of the document on top of a non-ideal surface. For example, the interferences may include scratches on the table on which the document lines, dots, ornament, irregular text, textures, etc. The level of noise in the frame can be removed or at least reduced using noise smoothing algorithms.

Referring back to FIG. 3, at block 303, the parts of the frame that are within the ROI in the viewfinder are processed by several specific operators that suppress noise. In other words, smoothing of the frame may be performed by removing or reducing noise which may interfere with subsequent analysis of a current picture (view). For example, subsequent analysis may include edge detection and/or OCR.

To smooth noise within the current picture (view) within the ROI, a variety of filters may be used. For example, a Median filter, a Maximum filter, and a Minimum filter may be utilized. For instance, processing of each 3×3 pixels window (or other window size) with a Maximum filter intensifies bright values in the current picture (view) by expansion of these areas. Each 3×3 (or other window size) window is analyzed for detection of the brightest pixel within the window. The detected brightest pixel may be the pixel in the center of the window. On the contrary, usage of the Minimum filter intensifies dark pixels in the current picture (view) by also expanding these areas. Each 3×3 (or other window size) window is analyzed for detection of the darkest pixel. The detected darkest pixel may be the pixel in the center of the window. As a result, by applying the Maximum filter, the noise interferences are filled with white color, and, on the contrary, by applying the Minimum filter, the noise interferences are filled with black color. While using the Median filter, the following formula may be used for computing the filter value: $(P_R+P_D+P_C)/3$, where $P_R$ is the median value of horizontal and vertical pixels within the 3×3 windows, $P_D$ is a median value of the pixels located on the diagonals of the window, and $P_C$ is the value of the central pixels. Any combination of these filters may be used together or sequentially for smoothing the noise within the current picture (view).

At block 304, a part of a current picture (view) within the ROI that was processed in the previous steps is processed by an adaptive edge detector. In one implementation, differential edge detection may be utilized. Other types of edge detectors may be used. As a result, black and white contour picture is formed.

By using an edge detection algorithm based on differentials (namely based on determining gradients), a variety of approaches may be used, including but not limited to, a Sobel operator, a Robert operator, or Prewitt operators. In a preferred embodiment, the Sobel operator may be used because it takes less time to compute, which is crucial when analysis of the current picture (view) is performed in real-time. The Sobel operator is a discrete differentiation operator, computing an approximate value of the gradient of the current picture (view) intensity function. The result of applying the Sobel operator in every point of the image includes the gradient vector of brightness or the norm of this vector. The Sobel operator is based on convolving of a current picture (view) by using small integer valued filters in the horizontal and vertical directions. Other operators may be also used.

Edge pixels are pixels in which the local maximum gradient in the direction of the gradient is achieved. Other pixels (not having the maximum values) are suppressed within the analyzed current picture (view).

The next step is to determine whether the edge is located at this certain point or not. Some pixels remaining after the process of suppression of non-maximums truly belong to the edge, but other pixels with maximum gradient values may appear due to some noise remaining after applying smoothing in the analyzed current picture (view). One of the ways to confirm the edge is to use a threshold value. This threshold value may be preliminarily determined or computed for each particular current picture (view). Other pixel values are compared with the threshold value. Pixels values weaker than the threshold value are suppressed, and pixel values stronger than the threshold value remain. The lower the threshold, the more boundaries will be located at the certain point, but the result may be more sensitive to the noise, keeping unnecessary details (edges) in the frame. On the contrary, a high threshold value may neglect poorly expressed edges or allow detection of fragmented edges. "Fragmented edges" means that a line (that represents an edge) will be not continuous but interrupted (dashed or broken dashed).

Several threshold values may be used. For example, the Canny edge detection method uses two threshold values for filtering pixel values, which may be suppressed. $T_H$ may denote a first (high) threshold value and $T_L$ may denote a second (low) threshold value. If a pixel value is more than the first (high) threshold value or equal to $T_H$, then the pixel takes a maximum value. If the pixel value is lower than the second (low) threshold value or equal to $T_L$, then the pixel is suppressed. Pixels values that are between the interval $(T_H; T_L)$ take a fixed average (or mean) value.

In each ROI, straight lines (edges) with maximum intensity of contour image along the area must be reliably detected. Intensity of a contour means the number of pixels belonging to the line. For example, for this purpose various methods can be used such as method of involving an exhaustive search among all possible candidates of edges. Alternatively, the Hough transform method may be used. When the method of exhaustive searching is utilized, all possible candidates of edges are examined. As a result, only edges that have maximum intensity contour are selected.

The method of a Hough transform applies a voting procedure for finding imperfect lines (edges) that are caused by some noise within an analyzed current picture (view). In one embodiment, this involves extracting the most appropriate results from the Hough transform accumulator and canceling inappropriate data (lines). The following steps may be performed: Hough transform accumulator filtrating; calculating of a threshold value for extracting lines from the accumulator; and threshold filtering of the accumulator. The Hough transform accumulator filtering is performed to identify real maximum values in the accumulator by suppressing other neighboring non-maximum values, for example, by using a filter that suppresses non-maximum points in the vicinity (i.e., a non-maximum suppression technique). The parameters for threshold filtering (including the value of the threshold) may be predefined or configured for a certain accumulator. If the parameters of filtering are configured for an accumulator, the threshold may be computed based on the highest maximum value. For example, the threshold may be set at a value approximately half of the highest maximum value. After that, filtering is performed in the following way: all pixels with values higher than the threshold value are considered to belong to the detected lines.

As a result of the above-described algorithm, four base lines (base candidates/base edges) should be successfully detected. The base lines form a candidate of a quadrangle-shaped document. Since in one ROI, several candidate lines (edges) of the document may be detected, a check may be performed using criteria of reliability must be used for removing falsely detected lines. To check the reliability (305) of detected lines by using different criteria, the reliability tests may be performed at each stage of searching for lines (edges).

For example, in one ROI, two edges may be detected with close values of contour energy $E_1$ and $E_2$, respectively, and at a distance H from each other, and differing from each other at an angle $\phi$. Accordingly, the following criterion may be applied to the values of contour energy:

$$E_1 - E_2 < T,$$

where T is a threshold value that may be computed based upon the analysis of a current picture (view) or may be set to a particular value by default. As a result of reliability criterion, both lines will be removed.

If the set of detected lines does not satisfy one or more of the reliability criteria, a search for additional edges (lines) is performed. For example, to detect additional lines in a current picture (view), the threshold value of filter in Hough transform may be decreased. If the parameters of filtering are configured for an accumulator, the threshold may be computed based on a value approximately quarter-size of the highest maximum value. The lines which were not detected due to the threshold value being too high will be detected during the second iteration of searching. Additionally, further detected edges are added to the initial set. Thus, the newly obtained new set of lines should be examined one more times for satisfying the reliability criteria. This process is iterative and will repeat until the detected lines meet the criteria of reliability.

If the detected lines (edges) satisfy the reliability criteria, a hypothesis about candidate document is formulated about formation of the document with these edges. According to this hypothesis identified during the described above analysis, the current picture (view) within the ROI, four candidate edges (one in each of the ROI) form a document (306). The obtained in this way candidate document is checked against one or more pre-set parameters (or proportions or dimensions), where the parameters (width and length of a document) may be specified in the settings by a user or programmatically according to a set of preset or common values.

The created candidate of the document is also verified for reliability criteria. In on embodiment, a minimum integral contour energy along each of the detected edges of the particular detected document is verified. Also, the created document may be tested for geometrical proportions. For example, the document may be tested for a ratio of the opposite sides or adjacent sides, or for the value ratios (the ratio of average for the pairs of opposite sides). In another example, the document may be tested for ratio of distances between opposite sides (edges) or the value equal to the ratio of the average distance between each pair of opposite sides.

The above-described method of edge detection may also be combined with the method of corner detection, where edge detection and corner detection are performed in real-time. The method of corner detection may be also performed separately.

The ROIs which are convenient for corner detection algorithm are illustrated in FIG. 1B. The method of corner detection includes identifying the interest point (e.g., corner), that occurs at the intersection of straight lines. Different corner detection algorithms or methods may be used to detect corners including, but not limited to, Harris & Stephens, Plessey, Shi-Tomasi, etc.

Next, at block 205 of FIG. 2, the proportions of the detected document (width and length) are compared with proportions preliminarily specified by the user (e.g., when the user was configuring the settings of the application or program). The parameters (or proportions) of the detected documents are compared with those parameters specified in the settings. For example, the width-to-length ratio $R_{det}$ of the detected document may be compared to width-to-length ratio $R_{specified}$ specified in the settings. If these coefficients are equal for at least one of the detected documents in the current picture (view), the image is automatically captured (block 206). As used herein, the term <<automatic capturing>> means that capturing does not require user's interference.

Figure 5C:
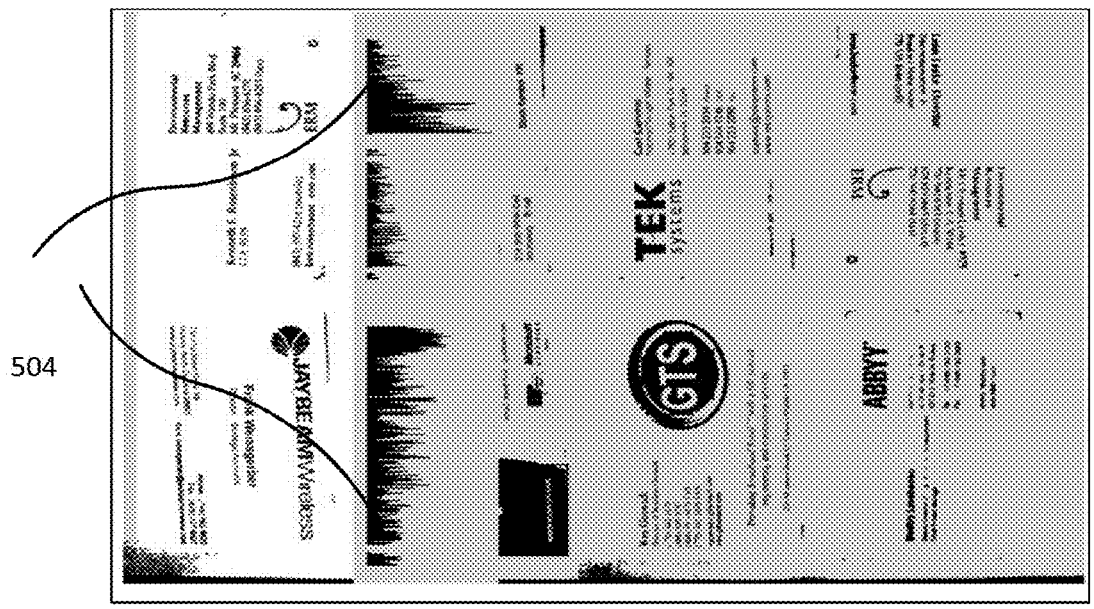
FIG. 5C is an illustration of an example of computation of a vertical histogram, in an accordance with an example implementation.
Figure 5D:
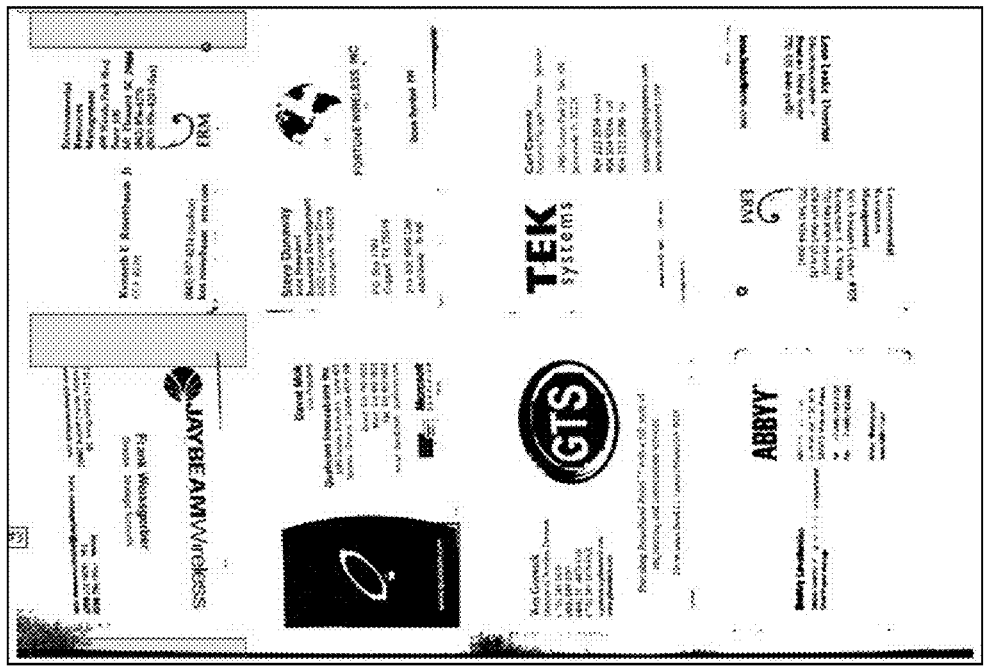
FIG. 5D is an illustration of an example of segmentation of a vertical strip into several parts, where each part is represented as a horizontal rectangular strip, in an accordance with an example implementation.
Figure 5E:
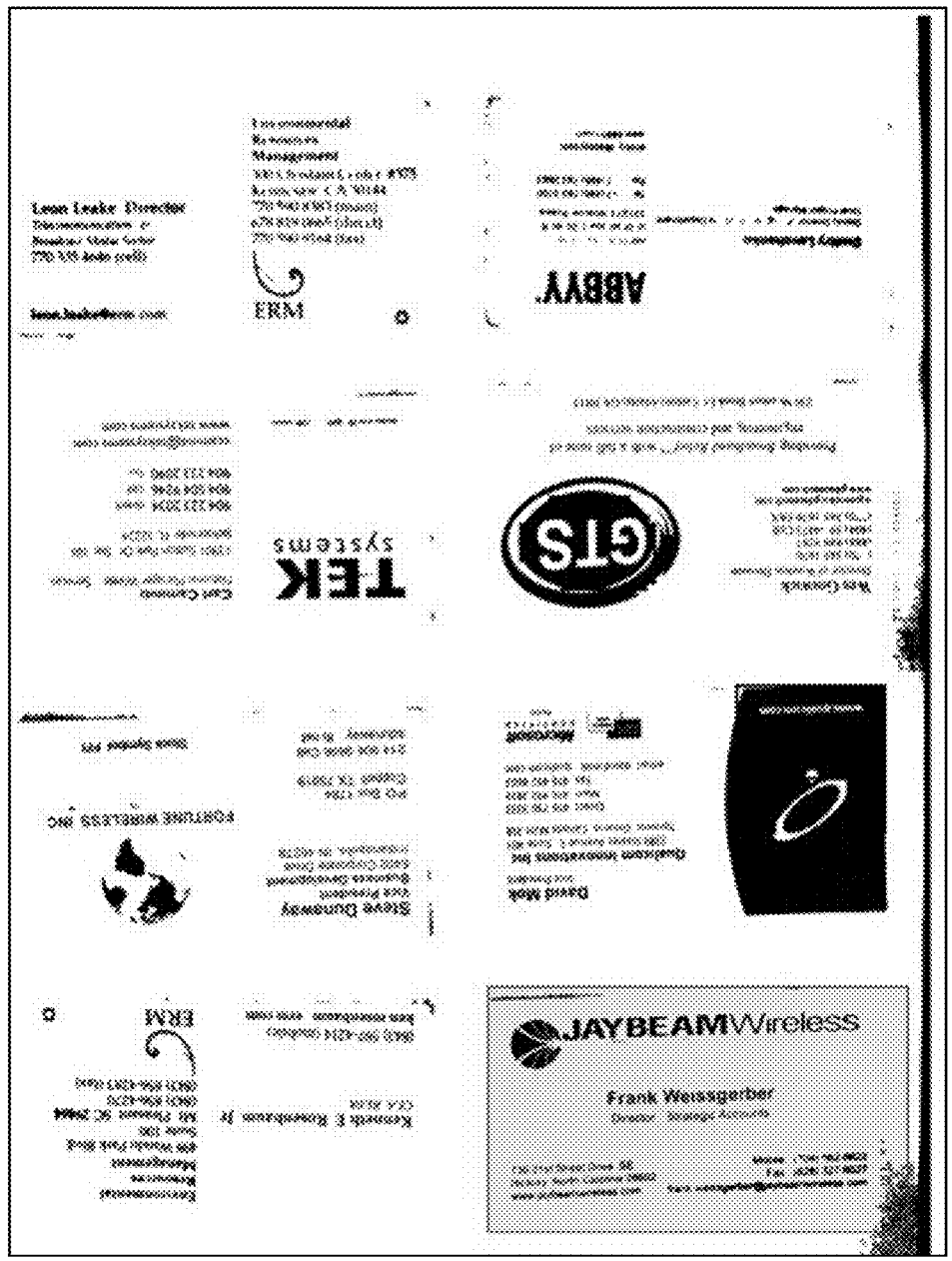
FIG. 5E is an illustration of results of detecting a document within current picture (view) in a viewfinder, in an accordance with an example implementation.

In another embodiment, the selected and analyzed current picture (view) may include several documents. As a result, the display screen 104 of the electronic device 102 displays several documents received by the viewfinder. When a user wishes to capture, for example, a double-page spread of a card holder with several business cards for subsequent processing, it is not convenient to capture each of the business cards separately (one by one). It would be too time consuming to process the business cards individually. FIG. 5 provides an illustration of several documents on the screen of the electronic device, which fit within bounds of the viewfinder. Thus, the disclose system or software application may detect the presence of several documents in a current picture (view) presented in a viewfinder of a camera, or region of a graphical user interface of a computer program.

Figure 4:
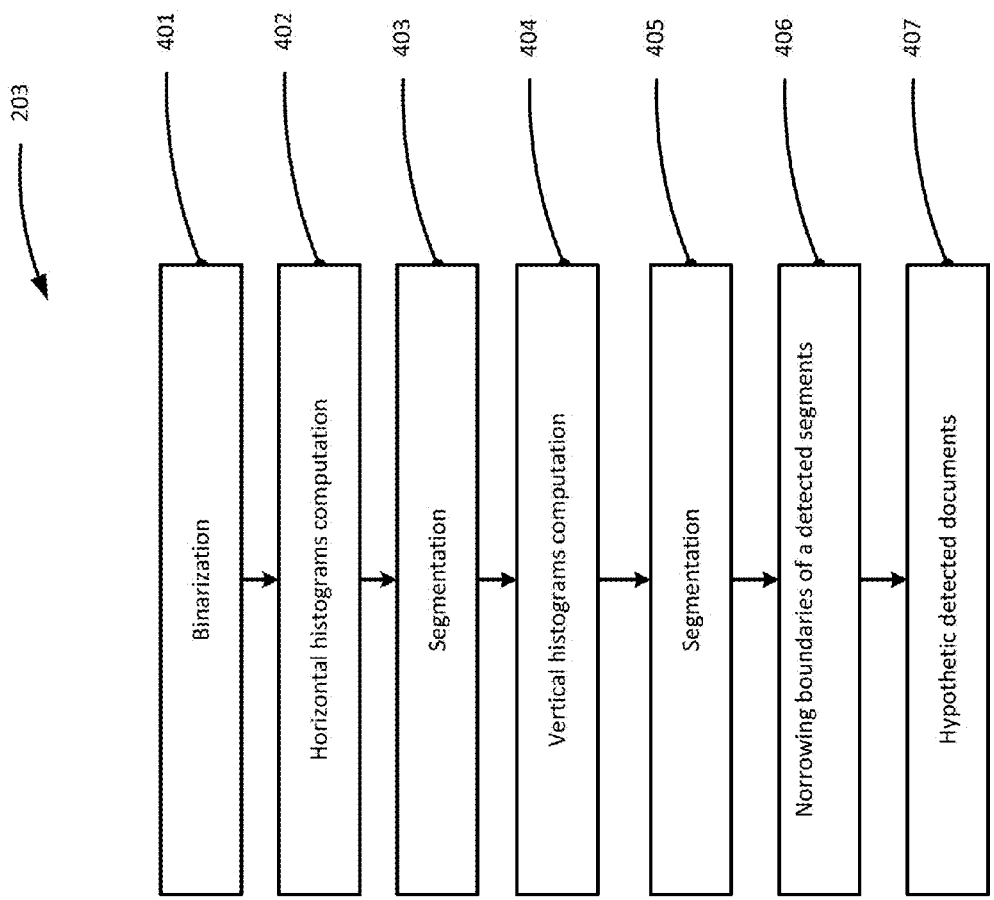
FIG. 4 is a flow diagram of a process for detecting several documents within a viewfinder of a camera application, in an accordance with an example implementation.

FIG. 4 is a flow diagram of a process 400 for detecting multiple documents in a frame. The process 400 can be implemented on a computing device (e.g., a user device). In one embodiment, the process 400 is encoded on a computer-readable medium that contains instructions that, when executed by the computing device, cause the computing device to perform operations of the process 400.

Current picture (view)s received in real-time from the viewfinder of the camera, without recording a video or capturing an image, are selected with a pre-determined frequency. Once the current picture (view) is selected, the real-time analysis of the selected current picture (view) starts. The analysis of the selected current picture (view) is performed without interrupting the video signal and without introducing time delay and distortions (between detecting and capturing of current picture (view)s by a camera).

In contrast to the method described with respect to FIG. 3, the entire current picture (view) in the viewfinder may be analyzed. In particular, the ROI includes the entire current picture (view) in the viewfinder or entire image captured by an image sensor. The method of detecting several documents in the analyzed current picture (view) includes identifying clear spaces within the current picture (view). The term "clear space" refers to space between the documents (for example, between the business cards).

An image segmentation technique (e.g., frame segmentation technique) may be utilized. In one embodiment, a histogram-based method is used as a segmentation technique. The basis of this method is histogram-based image segmentation of a complex scene into several homogeneous regions. The complex scene may include the analyzed current picture (view) that contains several documents represented on the display screen of an electronic device. Homogeneous regions (and quasi-homogeneous regions) represent documents that need to be detected within the analyzed current picture (view).

Binarization of a selected current picture (view) is performed (block 401). For converting the analyzed current picture (view) into a binary version, thresholding may be used. For example, the thresholding function T(p,t) calculates the binary version of image I, at point p, by thresholding it at a level t and may be represented as follows:

$$T(p,t)=[I(p) \geq t]$$

A pixel value that is greater than or equal to t may be set to value 1, and a pixel value less than t may be set to 0. The resulting image is called a binary image because each one of its pixels can only have one of two values. Other techniques for binarization of the current picture (view) also may be used.

A histogram-based segmentation technique includes a computation and formation of a histogram based on the pixels from the binary version of the captured current picture (view); the pixels having only one of two values: 0 and 1. In one implementation, after binarization, the number of black pixels $N_b$ and number of white pixels $N_w$ are computed. These values $N_b$ and $N_w$ are compared to identify the main "color" of the background. For example, if the number of white pixels $N_w$ is greater than the number of black pixels $N_b$, then the main background color may be white. Otherwise the main background color may be black. The term "background" refers to the color of the surface on which the documents are laying.

In another implementation, for the determination of the main color of the background of the binarized current picture (view), an algorithm or method of searching for horizontal or vertical lines within the current picture (view) may be utilized. This algorithm or method includes searching for a black or almost black horizontal or vertical line in the center of the current picture (view). The term "in the center" means that the search is performed away from the edges of the analyzed current picture (view). If as a result of this search, a line is identified, then the main color of the background is black, otherwise, the main color of a background is white.

In accordance with information about the main color of the background, a histogram is computed. The computed histogram visually represents distribution of black pixels on the white background inside the current picture (or contrarily, the amount of white pixels relative to a black background) along the vertical and horizontal lines of the analyzed current picture (view). In the example, histograms represent an amount of black pixels against a white background. FIG. 5A shows an example of a horizontal histogram 512, while FIG. 5C shows an example of a vertical histogram 514.

At step 402, the computation of a horizontal histogram (histogram of distribution of black pixels along horizontal direction of the current picture view) for the analyzed current picture (view) is performed. The result of the computation of a horizontal histogram for the entire analyzed current picture (view) is illustrated in FIG. 5A. As shown in FIG. 5A, the current picture (view) includes eight documents (eight business cards) arranged in a form of a matrix having 4 columns and 2 rows. This arrangement is consistent with a typical arrangement of business cards in commercially available card holders.

With reference to FIG. 5A, the histogram has <<peaks>> 501 and <<valleys>> 502. <<Peaks>> are maximum values in the histogram; <<valleys>> are minimum values. Among the extremes (minimum and maximum values), there are global extremes and local extremes. The global minimums need to be detected in order to identify <<valleys>> within the histogram. Clear spaces may be located in the vicinity or neighborhood of the global minimum in the <<valleys>> of the histogram.

As a result, hypotheses $(H_1, H_2, H_3, \ldots, H_n)$ are formulated about the location of global minimums in a horizontal histogram (or in other words, these locations of global minimums correspond to hypotheses about clear spaces). Through the coordinates of detected global minimums cutting lines may be established. Cutting lines are intended for separating a current picture (view) into several parts.

According to a hypothesis $H_1$, a first cutting line passes through the coordinate of the first detected global minimum of the histogram (or clear space, in the first detected valleys). According to the hypothesis $H_2$, the second cutting line passes through the coordinates of the second detected global minimum. According to hypothesis $H_3$, the third cutting line passes through the coordinates of the third detected global minimum, etc. After formulation of the hypotheses, the analyzed current picture (view) is separated into several parts along the cutting lines. In some embodiments, the separation of the current picture (view) is not final and may be changed during further analysis described below.

Because there are several hypotheses about locating the global minimums, some of the hypotheses may be false. If a cutting line passes through false global minimums, the results of the segmentation of the image into parts may have errors. To avoid this issue and to reject false hypotheses, one or more tests may be used. One of the approaches is to compute distances between all detected minimums in the histogram. After that, only those minimums that are located at the fixed appropriate distance are selected. If minimums are located at a fixed distance, the hypotheses about passing cutting lines through these global maximum are confirmed. Other hypotheses are then considered false and are rejected. The appropriate distance between the detected global minimums should equal the values of parameters (namely the width and the length) of the documents to be detected and photographed, where parameters pre-defined in the settings by the user.

After the global minimum selection in the horizontal histogram is finished, separating a current picture (view) into segments is performed by using only those cutting lines that pass through the detected global minimums. Segments represent vertical strips (as shown in FIG. 5B). After that, the analysis of each strip is performed.

At block 404, for each segment, histograms along the vertical direction are created in a similar fashion. As shown in FIG. 5C, the vertical histograms have peaks and valleys. Hypotheses $(V_1, V_2, V_3, \ldots, V_n)$ about the location of global minimums in the vertical histogram are formulated. According to the hypothesis $V_1$, the first cutting line passes through the coordinate of the first detected global minimum of the vertical histogram (or clear space, in the first detected valleys). According to the hypothesis $V_2$ the second cutting line passes through the coordinates of the second detected global minimum. According to hypothesis $V_3$, the third cutting line passes through the coordinates of the third detected global minimum, etc.

As in the case of the horizontal histograms, there are several hypotheses about locating global minimums, some of which may be false. If the cutting lines pass through the false global minimums, the results of the segmentation of the image into parts will have errors. To avoid this issue and reject false hypotheses, some tests may be used. One of the approaches involves computing distances between all detected minimums in the vertical histogram. Only the minimums that are located at a fixed distance from each other may be selected. If minimums are located at a fixed distance, the respective hypotheses are confirmed, while other hypotheses are considered false and are rejected. The appropriate distance between the selected global minimums should be equal the values of parameters (width and length) of the documents to be detected and photographed, where the parameters are preliminary specified by user in the settings.

After the global minimum selection in vertical histograms is finished, segmentation of the current picture (view) is performed. In contrast with the previous case (where horizontal histogram was computed), the segments represent horizontal strips (as shown in FIG. 5D). In our example, the result of separating the current picture (view) along the detected and verified global minimums (i.e. in clear spaces in the vertical and horizontal histograms, eight clusters (regions/rectangles) are created. Each of the segments may contain one document. In one example, the document is a business card. In the detected rectangular region, edges of the document are detected in accordance with gradient separators or internal feature objects. The method of edge or corner detection from the described above embodiment may be applied separately to each of detected rectangle area.

As a result, eight different documents are detected within the current picture (view). Each of them has geometrical parameters (the width and the length). The parameters (or proportions) of the detected documents are compared with the specified in the settings parameters (proportions). For example, the width-to-length ratio $R_{det}$ of the detected documents may be compared with specified in the settings width-to-length ratio $R_{specified}$. If these coefficients are equal for at least one of the detected document in the current picture (view), the image is captured at block 206 of the flow diagram in FIG. 2.

If the document or several documents of the specified parameters are detected in the viewfinder, then the step of tracking the readings of the accelerometers (or other devices) for the moment of stabilization of an electronic device is performed. This stop may be optional and may be omitted.

After the successful completion of all the steps described above, the electronic device performs step 206 of automatic capturing of the detected document. The term "automatic capturing" means that the camera is taking a picture without user intervention.

During the capturing of the analyzed current picture (view), rectangular documents (for example business cards) may be represented in the current picture (view) as a trapezium due to distortion. As a result, the text in the document in the current picture (view) may also be distorted. The distorted text may be difficult to recognize. Thus, the distortion needs to be detected and corrected. The described methods and system are able to detect the distorted rectangle and correct a distortion as a result of impact of perspective in the process of photography. The document (in this particular case a business card) of a rectangular shape is represented in the current picture (view) as a trapezium. In one of the embodiments, after the detection of a current picture (view) containing distorted documents, selection of a current picture (view) containing the least distorted documents is performed. This step may be included in the flow diagram of FIG. 2. But it is optional and may be skipped.

Figure 6:
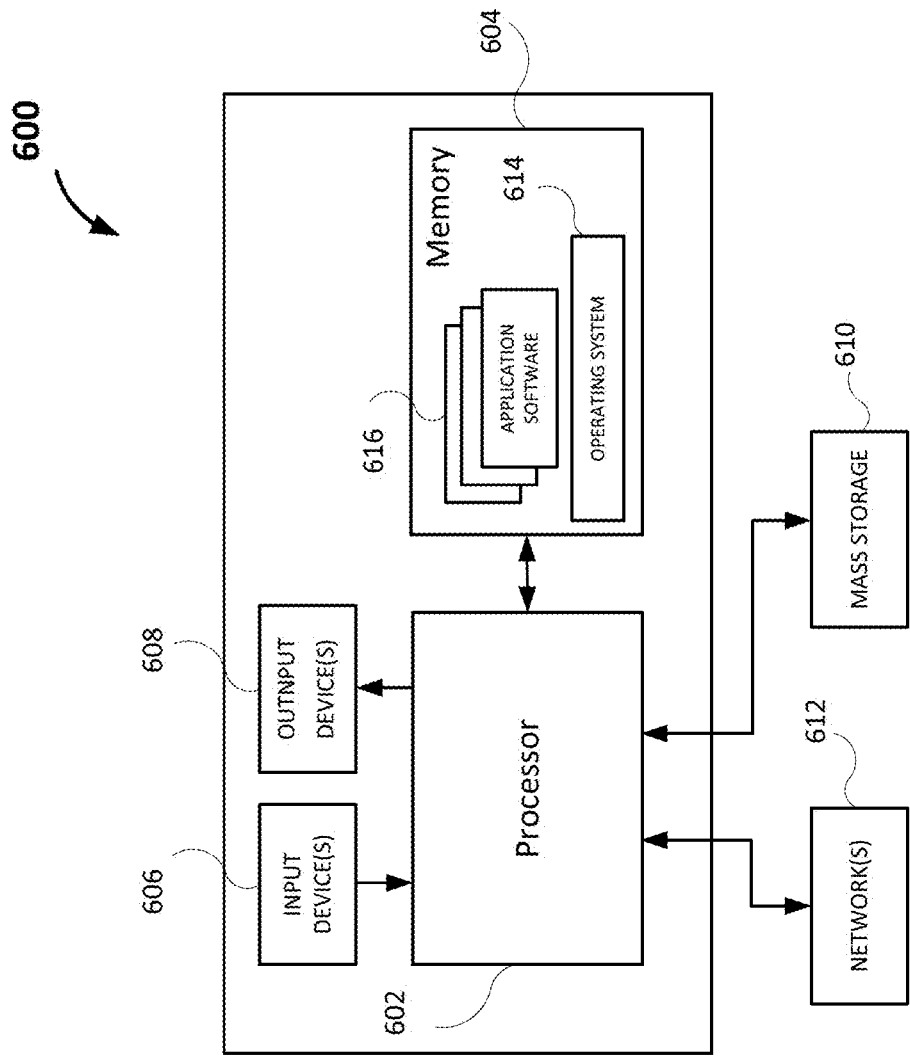
FIG. 6 is a diagram of an electronic device that can be used to capture images, in accordance with an example implementation.

FIG. 6 shows hardware 600 that may be used to implement the user electronic device 102 in accordance with one embodiment of the invention. Referring to FIG. 6, the hardware 600 typically includes at least one processor 602 coupled to a memory 604 and having touch screen among output devices 608 which in this case is serves also as an input device 606. The processor 602 may be any commercially available CPU. The processor 602 may represent one or more processors (e.g., microprocessors), and the memory 604 may represent random access memory (RAM) devices comprising a main storage of the hardware 600, as well as any supplemental levels of memory, e.g., cache memories, non-volatile or back-up memories (e.g., programmable or flash memories), read-only memories, etc. In addition, the memory 604 may be considered to include memory storage physically located elsewhere in the hardware 600, e.g., any cache memory in the processor 602 as well as any storage capacity used as a virtual memory, e.g., as stored on a mass storage device 610.

The hardware 600 also typically receives a number of inputs and outputs for communicating information externally. For interface with a user or operator, the hardware 600 usually includes one or more user input devices 606 (e.g., a keyboard, a mouse, imaging device, scanner, etc.) and a one or more output devices 608 (e.g., a Liquid Crystal Display (LCD) panel, a sound playback device (speaker). To embody the present invention, the hardware 600 must include at least one touch screen device (for example, a touch screen), an interactive whiteboard or any other device which allows the user to interact with a computer by touching areas on the screen. The keyboard is not obligatory in case of embodiment of the present invention.

For additional storage, the hardware 600 may also include one or more mass storage devices 610, e.g., a floppy or other removable disk drive, a hard disk drive, a Direct Access Storage Device (DASD), an optical drive (e.g., a Compact Disk (CD) drive, a Digital Versatile Disk (DVD) drive, etc.) and/or a tape drive, among others. Furthermore, the hardware 600 may include an interface with one or more networks 612 (e.g., a local area network (LAN), a wide area network (WAN), a wireless network, and/or the Internet among others) to permit the communication of information with other computers coupled to the networks. It should be appreciated that the hardware 600 typically includes suitable analog and/or digital interfaces between the processor 602 and each of the components 604, 606, 608, and 612 as is well known in the art.

The hardware 600 operates under the control of an operating system 614, and executes various computer software applications 616, components, programs, objects, modules, etc. to implement the techniques described above. In particular, the computer software applications will include the client dictionary application and also other installed applications for displaying text and/or text image content such a word processor, dedicated e-book reader etc. in the case of the client user device 102. Moreover, various applications, components, programs, objects, etc., collectively indicated by reference 616 in FIG. 6, may also execute on one or more processors in another computer coupled to the hardware 600 via a network 612, e.g., in a distributed computing environment, whereby the processing required to implement the functions of a computer program may be allocated to multiple computers over a network. Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be deleted to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product embodied on a tangible medium or packaged into multiple such software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method for automatically capturing of an electronic image of documents based on results of a preliminary analysis of a current view in a viewfinder, the method comprising:
    selecting a frame in the viewfinder;
    converting the frame into a binary version of the frame;
    computing a horizontal histogram of distribution of pixels along horizontal direction of the binarized version of the frame;
    computing a vertical histogram of distribution of pixels along vertical direction of the binarized version of the frame;
    performing segmentation of the binarized version of the frame using the horizontal histogram and the vertical histogram resulting in one or more horizontal and vertical segments, wherein each of the one or more horizontal and vertical segments corresponds to one document included in the frame;
    identifying at least one document in the selected frame, wherein one or more parameters are associated with the at least one document;
    comparing values of one or more parameters associated with the at least one identified document with predetermined values for the one or more parameters; and
    capturing the at least one document upon determining that values of the one or more parameters associated with the document match predetermined values corresponding to the one or parameters.

2. The method of claim 1, wherein the frame selection occurs at a predetermined frequency.

3. The method of claim 2, wherein the predetermined frequency specifies a number of frames per second.

4. The method of claim 1, wherein the predetermined values of the one or more predetermined parameters are received from a user interface allowing a user to specify values for the parameters.

5. The method of claim 1, wherein the one or more parameters include geometrical proportions.

6. The method of claim 1, wherein the one or more parameters include a parameter specifying a width to length ratio.

7. The method of claim 6, wherein the width to length ratio of the document matches the predetermined width to length ratio.

8. The method of claim 1, further comprising:
    compressing the frame;
    smoothing noise interferences in one or more search areas of the compressed frame;
    detecting edges within each of the search areas of the compressed frame using a differential edge detection algorithm, wherein the detected edges form the document within the compressed frame; and
    performing one or more checks on the detected edges within the search areas.

9. The method of claim 8, wherein performing one or more checks on the detected edges within the search areas is based on checking at least one of the reliability criteria to determine baseline for one or more candidate documents, and wherein the process of identifying baselines is performed in an iterative manner based on searching for additional detected edges, until additional detected edges will meet the reliability criteria.

10. The method of claim 8, wherein detecting edges in the detected current view includes applying a techniques of searching edges with maximum value of intensity of a contour, wherein searching edges with maximum value of intensity of a contour is performed based on Hough transform and exhaustive search among all possible candidates.

11. The method of claim 8, wherein the one or more search areas are rectangular areas of predefined dimensions.

12. The method of claim 8, wherein the one or more search areas are quarter circles with centers located in corners of the viewfinder with predefined radiuses.

13. The method of claim 8, wherein:
detecting edges includes detecting edges for each of a plurality of documents in the detected current view; and
checking the reliability criterion includes checking the reliability criterion for each of the plurality of documents in the detected current view.

14. The method of claim 8, wherein the smoothing of noise interferences is performed using at least one of: a minimum filter, a maximum filter, and a medium filter.

15. The method of claim 8, wherein the differential edge detection method is operator based on differentials to pixels within regions of interest of the selected current view.

16. The method of claim 8, wherein detecting edges in the detected current view includes applying techniques of suppression non-maximum pixel values within regions of interest of the detected current view by applying one or more threshold values.

17. The method of claim 1, wherein performing segmentation further comprises:
determining a hypothesis about a candidate document;
displaying in a viewfinder the candidate document; and
checking the candidate document by applying at least one reliability criterion.

18. The method of claim 1, further comprising converting the frame into a grayscale frame, wherein the frame is a color frame.

19. The method of claim 18, wherein the frame is compressed using bilinear interpolation.

20. The method of claim 1, further comprising:
detecting corners for each candidate document within a current view; and
checking a reliability criteria related to corners for each candidate document.

21. The method of claim 20, wherein said detecting of corners is performed in a region of interest, wherein the region of interest is quarter circular area relative to a respective corner of the selected current view, one quarter circular in corners of a viewfinder.

22. The method of claim 1, wherein computing histograms further comprises:
detecting global extreme values in the histogram;
verifying detected global extreme values by at least one of the criteria;
generating cutting lines passing in a neighborhood of detected global extreme values;
segmenting analyzed current view into several areas along the cutting lines; and
analyzing at least one segmented area.

23. The method of claim 1, wherein analyzing at least one segmented area comprises applying information of gradient separators within each area, internal feature objects.

24. The method of claim 1, wherein selecting the frame in a viewfinder further comprises:
analyzing a detected document for the level of distortions; and
selecting current views with minimum level of distortions for the subsequent capturing.

25. A system comprising:
one or more data processors; and
one or more storage devices storing instructions that, when executed by the one or more data processors, cause the one or more data processors to perform operations comprising:
selecting a frame in a viewfinder;
converting the frame into a binary version of the frame;
computing a horizontal histogram of distribution of pixels along horizontal direction of the binarized version of the frame;
computing a vertical histogram of distribution of pixels along vertical direction of the binarized version of the frame;
performing segmentation of the binarized version of the frame using the horizontal histogram and the vertical histogram resulting in one or more horizontal and vertical segments, wherein each of the one or more horizontal and vertical segments corresponds to one document included in the frame;
identifying at least one document in the selected frame, wherein one or more parameters are associated with the at least one document;
comparing values of one or more parameters associated with the at least one identified document with predetermined values for the one or more parameters; and
capturing the at least one document upon determining that values of the one or more parameters associated with the document match predetermined values corresponding to the one or parameters.

26. The system of claim 25, wherein the frame selection occurs at a predetermined frequency.

27. The system of claim 26, wherein the predetermined frequency specifies a number of frames per second.

28. The system of claim 25, wherein the predetermined values of the one or more predetermined parameters are received from a user interface allowing a user to specify values for the predetermined parameters.

29. The system of claim 25, wherein the one or more predetermined parameters include geometrical proportions.

30. The system of claim 25, wherein the one or more predetermined parameters include a parameter specifying a width to length ratio.

31. The system of claim 30, wherein the width to length ratio of the document matches the predetermined width to length ratio.

32. A non-transitory computer-readable storage medium having machine instructions stored therein, the instructions being executable by a processor to cause the processor to perform operations comprising:
selecting a frame in a viewfinder;
converting the frame into a binary version of the frame;
computing a horizontal histogram of distribution of pixels along horizontal direction of the binarized version of the frame;
computing a vertical histogram of distribution of pixels along vertical direction of the binarized version of the frame;
performing segmentation of the binarized version of the frame using the horizontal histogram and the vertical histogram resulting in one or more horizontal and vertical segments, wherein each of the one or more horizontal and vertical segments corresponds to one document included in the frame;
identifying at least one document in the selected frame, wherein one or more parameters are associated with the at least one document;

comparing values of one or more parameters associated with the at least one identified document with predetermined values for the one or more parameters; and
capturing the at least one document upon determining that values of the one or more parameters associated with the document match predetermined values corresponding to the one or parameters.

\* \* \* \* \*